April 1, 1947. H. A. FLOGAUS ET AL 2,418,294
DUCT FOR DIRECTING COOLING AIR TO A MOTOR VEHICLE ENGINE
Filed Oct. 4, 1944 2 Sheets-Sheet 1
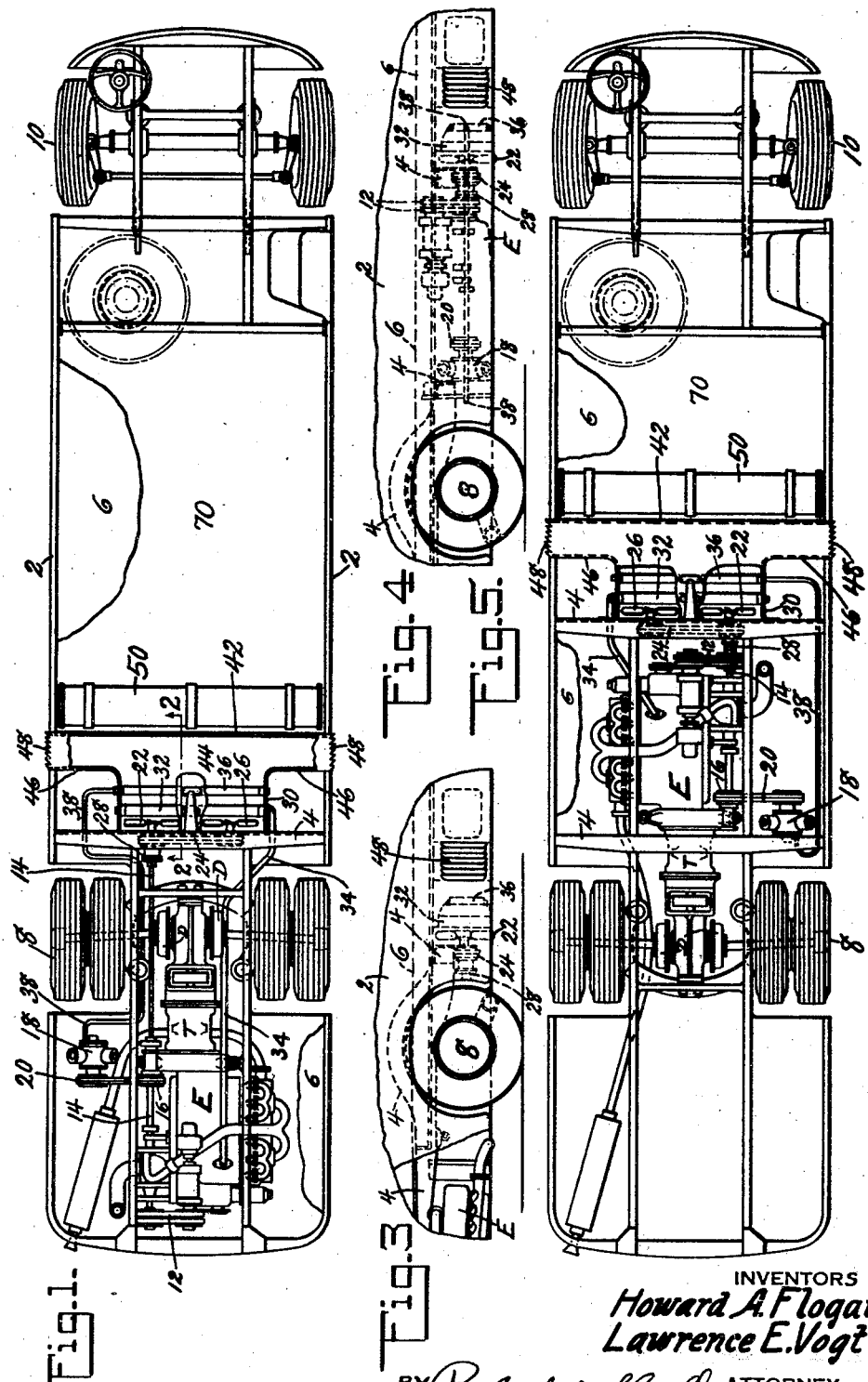
INVENTORS
*Howard A. Flogaus*
*Lawrence E. Vogt*
BY *Robert A. Shields* ATTORNEY

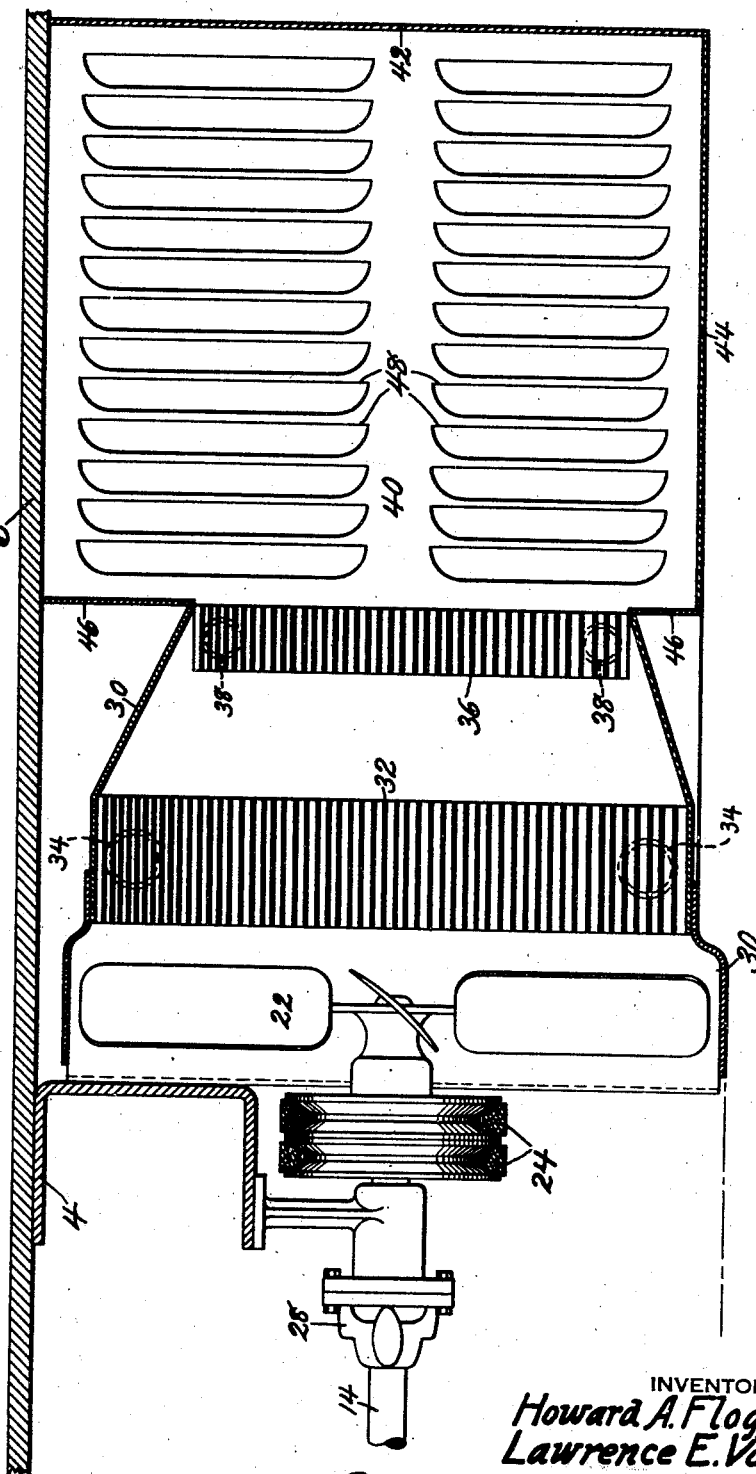

Patented Apr. 1, 1947

2,418,294

UNITED STATES PATENT OFFICE 2,418,294

DUCT FOR DIRECTING COOLING AIR TO MOTOR VEHICLE ENGINES

Howard A. Flogaus, Wallingford, and Lawrence E. Vogt, Lansdowne, Pa., assignors to ACF-Brill Motors Company, New York, N. Y., a corporation of Delaware Application October 4, 1944, Serial No. 557,107

8 Claims. (Cl. 180—54)

This invention relates to motor vehicles in general and in particular to air cooled motor vehicles having the motive power located beneath the passenger supporting floor.

With conventional motor vehicle construction the engine, radiator, and fuel supply for the engine can be located more or less separated since passenger space has been sacrificed to accommodate these necessary parts of the vehicle. Recently increased passenger space for a given overall length has been obtained by placing the engine and necessary accessories beneath the passenger supporting floor. In some cases the engine has been located between the axles, while in other cases it has been located rearwardly of the rear axle, either in a horizontal position or vertically, but in any case it has been located beneath the passenger supporting floor. With the crowding of the engine and its cooling equipment into the space beneath the passenger supporting floor great difficulty has been met with in attempting to dissipate the large amount of heat generated by the engine. When baggage or other storage space is provided beneath the passenger supporting floor articles in such space have on occasion been damaged due to the relatively high heat transmitted from the engine. Likewise, it has been necessary with this construction to place the fuel storage tanks beneath the passenger floor and these storage tanks were, of course, subjected to the heat generated by the engine and were accordingly a hazard to safe operation of the vehicle. Also, with modern motor vehicles it is desirable to lower the center of gravity as much as possible and this has recently been done by new springing arrangements thus further decreasing the amount of space available between the road surface and passenger supporting floor. This decrease in space further complicates the problems of cooling the engine. It is an object, therefore, of the present invention to provide a motor vehicle having an engine and radiator located beneath the passenger supporting floor and supplied with clean fresh air by means of an air duct extending transversely of the vehicle substantially from side wall to side wall.

A further object of the invention is the provision of the motor vehicle having a transversely extending air duct located beneath the floor and forming a barrier preventing transmission of heat from the engine or other heat generating devices to the fuel supply or baggage storage space, also located beneath the vehicle floor.

A still further object of the invention is to provide a single effective means to conduct fresh air from the sides of the vehicle to a plurality of radiators located beneath the vehicle floor and between the axles.

These and other objects of the invention will be apparent to persons skilled in the art from a study of the following description and accompanying drawings, in which Fig. 1 is a plan view of the improved motor vehicle with portions of the body broken away to better disclose the construction and location of parts;

Fig. 2 is an enlarged sectional view taken substantially on line 2—2 of Fig. 1;

Fig. 3 is an elevational view of a portion of the vehicle to better disclose the location of the equipment;

Fig. 4 is an elevational view similar to Fig. 3 but showing a slight modification, and Fig. 5 is a plan view of the modified form of motor vehicle disclosed in Fig. 4.

Referring now to the drawings in detail it will be seen that the motor vehicle is constructed with side walls 2, supported on underframe elements 4, which side walls and underframe support a passenger supporting floor 6. The vehicle body is supported upon rear axle and wheel asemblies 8 and front axle and wheel assemblies 10. In order to propel the vehicle an engine E is carried by the underframe elements in a horizontal position beneath the floor 6. The engine drives the rear axle and wheel assembly by means of transmission T and differential D. The engine is equipped with the customary crank shaft extension carrying a pulley or pulleys adapted to receive belts 12 which drive a longitudinally extending shaft 14. This shaft extends substantially parallel to the engine crank shaft and carries thereon pulleys 16 adapted to drive a compressor 18 by means of belts 20. The shaft also may be directly connected to a fan 22 and indirectly through belting 24 to a fan 26. In order to permit a slight weaving of the frame and for ease in assembling parts, the shaft is preferably connected to fan 22 by means of flexible coupling 28, clearly shown in Fig. 2. The fans 22 and 26 are mounted in a housing 30 carried by the underframe beneath the vehicle floor and these fans are adapted to draw air through engine radiators 32 connected by piping 34 to the water jacket of the engine. The housing also is adapted to receive condensers 36 connected by piping 38 to the compressor 18 which, in the present instance, is adapted to supply refrigerant under pressure to the vehicle to cool the passenger space. Housing 30 merges into and forms a part of an air duct 40 extending from side wall to side wall of the vehicle beneath the floor thereof. This air duct as clearly shown in Fig. 2, is formed by a front continuous wall 42, a bottom continuous wall 44 and a rear wall 46, which rear wall is open to permit flow of air from the duct into the housing 30. The top wall of the air duct may be formed separately or may be formed by the under surface of the vehicle floor as shown. The ends of the duct are partially closed by means of the vehicle side walls which are slotted to provide louvers 48 directed forwardly so as to assist the fans in bringing air into the transverse duct. Fuel storage tanks 50 are located forwardly of the transversely extending air duct as is also the storage space 70 for baggage or other articles.

In the form shown in Figs. 1, 2 and 3 the engine, transmission, and compressor, all of which generate a certain amount of heat, are located beneath the vehicle floor rearwardly of the driven axles, while the radiators, fans and air duct are located forwardly of the driven axle but between the heat generating devices and the engine fuel supply and baggage space. By locating the engine rearwardly of the axle increased storage space is obtained and in some instances a better load distribution on the supporting axles. The engine has been shown as arranged in a horizontal position but could be arranged equally well in a vertical position behind the back seat, which still forms a part of the passenger supporting structure or floor.

In the slight modification shown in Figs. 4 and 5 the engine, transmission, and refrigerant compressor are located forwardly of the driven rear axle and beneath the passenger supporting floor. Such location of the engine necessitates shifting the radiators, transverse air duct and fuel storage tanks forwardly, thereby cutting down on the size of the baggage or other storage space, but the radiators are still located forwardly of the engine and between the axles and the transverse air duct is still between the engine and the fuel tanks and storage space.

From the preceding description it will be seen that irrespective of the engine location with respect to the driven axle, the radiators for the engine and refrigerant compressor are located forwardly of the engine and between the axles and also beneath the passenger supporting floor. Likewise, the transverse air duct is located between the fuel tanks or storage space and the heat radiating devices, such as the engine, compressor, transmission, and radiators. Operation of the engine will cause fresh cooled air to be drawn through the air duct and radiators, thus establishing a heat conducting barrier effectively blocking any transmission of heat from the engine or its accessories to the fuel tanks or storage space. It will also be obvious that by use of the full transverse air duct flow of air to the radiators is not disturbed by the turbulence of air beneath the vehicle and but slightly by the direction of the wind exterior of the vehicle.

While the construction has been described more or less in detail, it will be apparent to persons skilled in the art that various modifications and rearrangements of parts may be made without departing from the spirit of the invention as set forth in the following claims.

What is claimed is:

1. In a motor vehicle having a passenger supporting floor and a front axle, an engine disposed beneath the floor, a source of fuel for the engine also disposed beneath the floor forwardly of the engine and behind the front axle, means to cool the engine located beneath the vehicle floor between said engine and source of fuel, and an air duct located beneath the vehicle floor for supplying air to said means, said air duct being so constructed and arranged as to form a barrier preventing transmission of heat from said engine to said source of fuel.

2. In a motor vehicle having a front axle, a passenger supporting floor and side walls extending below the floor, an engine disposed beneath the floor, an enclosed storage space beneath the floor and positioned between the side walls forwardly of said engine and behind the front axle, a radiator located beneath the floor between said engine and storage space, and an air duct extending transversely of the vehicle substantially from side wall to side wall behind the storage space, said air duct conducting air to said radiator to cool the same and serving as an insulating means preventing transmission of engine heat to said storage space.

3. In a motor vehicle having a passenger supporting floor, supporting axles, an engine located beneath the floor, an engine radiator located beneath the floor forwardly of said engine, a storage space located beneath the floor rearwardly of the front axle, and also forwardly of said engine radiator, and an air duct for conducting fresh air to said engine radiator and extending transversely of the vehicle beneath the floor and located between said engine and storage space to thereby serve as a heat insulator preventing transmission of heat from said engine to said storage space.

4. In a motor vehicle having a floor and vehicle side walls projecting beneath the floor, a closed storage space between the side walls below the floor having a rear transversely extending wall, a fuel tank in the rear of the storage space, a radiator between the depending side walls spaced rearwardly of the transverse wall, an engine beneath the floor rearwardly of the radiator, and an air chamber between the radiator and transverse wall having air inlets in the side walls below the floor and behind the transverse wall.

5. In a motor vehicle having a floor and vehicle side walls depending beneath the floor, a fuel tank located to the rear of the front end of the floor, a heat transfer member, an engine, said tank, said heat transfer member and said engine being fixed in spaced relation between the side walls and beneath the floor in the order named from front to rear, and an air chamber between the fuel tank and the heat transfer member having inlets through the side walls directly behind said fuel tank whereby the incoming air insulates the fuel tank from engine heat before passing to the heat transfer member.

6. In a motor vehicle having a floor, a fuel tank, a radiator, an engine, said tank, radiator and engine being confined in a longitudinally extending space beneath the floor and in the order named from front to rear, said tank being to the rear of the forward end of the floor, and an air duct between the fuel tank and the radiator through which air flows rearwardly through the radiator and toward the engine, the air flowing into the duct insulating the fuel tank from engine heat.

7. In a motor vehicle having a floor and body side walls extending below the floor to form a longtiudinally extending space, a fuel tank, a radiator, an engine, said tank, radiator and engine being fixed in spaced relation in said space in the order named from front to rear, said tank being to the rear of the front end of the floor, and shrouding means between the radiator and fuel tank through which air flows through the side walls to the radiator, the incoming air serving to first insulate the fuel tank from engine heat and to absorb heat from the radiator as it flows rearwardly toward the engine.

8. In a motor vehicle having a floor a fuel tank, a radiator, an engine, said tank, said radiator and said engine being fixed beneath the floor and in spaced longitudinal alignment in the order named from front to rear, said tank being located rearwardly from the front end of the floor, a transverse wall between the tank and the radiator, and means for directing air into the space between the transverse wall and the radiator, the incoming air for the radiator insulating the fuel tank from engine heat.

HOWARD A. FLOGAUS.
LAWRENCE E. VOGT.

REFERENCES CITED

The following references are of record in the file of this patent:

UNITED STATES PATENTS

| Number | Name | Date |
|---|---|---|
| 2,242,494 | Wolf | May 20, 1941 |
| 2,005,312 | Church | June 18, 1935 |
| 1,526,258 | Trasky | Feb. 10, 1925 |
| 2,050,836 | Graham | Aug. 11, 1936 |
| 2,286,416 | Holmstrom | June 16, 1942 |
| 2,336,089 | Gould | Dec. 7, 1943 |

FOREIGN PATENTS

| Number | Country | Date |
|---|---|---|
| 206,823 | British | Feb. 28, 1924 |
| 320,725 | British | Oct. 24, 1929 |